United States Patent
Estevez et al.

(10) Patent No.: US 9,686,818 B2
(45) Date of Patent: Jun. 20, 2017

(54) SYSTEMS AND METHODS OF POWER EFFICIENT WI-FI

(71) Applicant: Texas Instruments Incorporated, Dallas, TX (US)

(72) Inventors: Leo Estevez, Rowlett, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 161 days.

(21) Appl. No.: 14/475,024

(22) Filed: Sep. 2, 2014

(65) Prior Publication Data
US 2016/0066263 A1    Mar. 3, 2016

(51) Int. Cl.
| | |
|---|---|
| H04W 4/00 | (2009.01) |
| H04W 80/04 | (2009.01) |
| H04W 52/02 | (2009.01) |
| H04W 84/12 | (2009.01) |
| H04W 88/04 | (2009.01) |

(52) U.S. Cl.
CPC ....... H04W 80/04 (2013.01); H04W 52/0229 (2013.01); H04W 52/0245 (2013.01); H04W 52/0261 (2013.01); H04W 84/12 (2013.01); H04W 88/04 (2013.01); Y02B 60/50 (2013.01)

(58) Field of Classification Search
CPC . H04W 80/04; H04W 80/12; H04W 52/0229; H04W 52/0245; H04W 52/0261; H04B 60/50
USPC ........ 370/315–326, 328–330, 338, 465–469; 375/211–214
See application file for complete search history.

(56) References Cited

U.S. PATENT DOCUMENTS

| | | | |
|---|---|---|---|
| 2004/0192322 A1* | 9/2004 | Dacosta | H04W 28/20 455/452.1 |
| 2007/0116092 A1* | 5/2007 | Nystrom | H03M 13/3905 375/130 |
| 2008/0045212 A1* | 2/2008 | Kim | H04W 28/18 455/435.1 |
| 2008/0151802 A1* | 6/2008 | Sheu | H04W 76/046 370/311 |
| 2009/0268662 A1* | 10/2009 | Larsson | H03M 7/30 370/328 |
| 2012/0072751 A1* | 3/2012 | Das | H04W 52/0229 713/323 |

(Continued)

*Primary Examiner* — Thai Hoang
(74) *Attorney, Agent, or Firm* — Ronald O. Neerings; Charles A. Brill; Frank D. Cimino

(57) ABSTRACT

In example embodiments disclosed herein, a primary wireless device infrequently sends a ping to a secondary device to determine if there are any communications from an access point intended for the primary wireless device. The secondary device, ideally connected to wall power, is wirelessly connected to the access point, acting as a connected proxy so that the primary wireless device, typically battery powered, does not always have to be connected. In a situation in which an incoming communication is intended for the primary device, the secondary device receives the notification and buffers whatever is sent from the access point intended for the primary wireless device and acknowledges the receipt. Then, when the primary wireless device pings the secondary device, the secondary device sends the buffered communication to the primary wireless device. As far as the access point is concerned, it thinks it is communicating directly with primary wireless device.

18 Claims, 2 Drawing Sheets

(56) References Cited

U.S. PATENT DOCUMENTS

| | | | |
|---|---|---|---|
| 2014/0362763 A1* | 12/2014 | Hu ..................... | H04W 88/085 370/315 |
| 2015/0327304 A1* | 11/2015 | Tinnakornsrisuphap ......................... | H04L 41/0809 709/227 |
| 2016/0066263 A1* | 3/2016 | Estevez ................ | H04W 80/04 370/338 |
| 2016/0073342 A1* | 3/2016 | Szewczyk ......... | H04W 52/0216 370/311 |
| 2016/0073343 A1* | 3/2016 | Szewczyk ......... | H04W 52/0216 370/311 |

\* cited by examiner

SYSTEMS AND METHODS OF POWER EFFICIENT WI-FI

TECHNICAL FIELD

The present disclosure is generally related to telecommunications and, more particularly, is related to Wi-Fi communications.

BACKGROUND

In computer networking, a wireless Access Point (AP) refers to a device that allows wireless devices to connect to a wired network using Wi-Fi, or related standards. The AP usually connects to a router (via a wired network) as a standalone device, but can also be an integral component of the router itself.

Prior to wireless networks, setting up a computer network in a business, home or school often required running many cables through walls and ceilings in order to deliver network access to all of the network-enabled devices in the building. With the creation of the wireless Access Point (AP), network users are now able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies. Those standards and the frequencies they use are defined by the IEEE. Most APs use IEEE 802.11 standards.

A typical corporate use involves attaching several APs to a wired network and then providing wireless access to the office LAN. The wireless access points are managed by a WLAN Controller which handles automatic adjustments to RF power, channels, authentication, and security. Further, controllers can be combined to form a wireless mobility group to allow inter-controller roaming. The controllers can be part of a mobility domain to allow clients access throughout large or regional office locations. This saves the clients time and administrators overhead because it can automatically re-associate or re-authenticate.

A hotspot is a common public application of APs, where wireless clients can connect to the Internet without regard for the particular networks to which they have attached for the moment. The concept has become common in large cities, where a combination of coffeehouses, libraries, as well as privately owned open access points, allow clients to stay more or less continuously connected to the Internet, while moving around. A collection of connected hotspots can be referred to as a lily pad network.

APs are commonly used in home wireless networks. Home networks generally have only one AP to connect all the computers in a home. Most are wireless routers, meaning converged devices that include the AP, a router, and, often, an Ethernet switch. Many also include a broadband modem. In places where most homes have their own AP within range of the neighbor's AP, it's possible for technically savvy people to turn off their encryption and set up a wireless community network, creating an intra-city communication network although this does not negate the requirement for a wired network.

Some people confuse wireless access points with wireless ad hoc networks. An ad hoc network uses a connection between two or more devices without using a wireless access point: the devices communicate directly when in range. An ad hoc network is used in situations such as a quick data exchange or a multiplayer LAN game because setup is easy and does not require an access point. Due to its peer-to-peer layout, ad hoc connections are similar to Bluetooth ones and are generally not recommended for a permanent installation.

Internet access via ad hoc networks, using features like Windows' Internet Connection Sharing, may work well with a small number of devices that are close to each other, but ad hoc networks don't scale well. Internet traffic will converge to the nodes with direct internet connection, potentially congesting these nodes. For internet-enabled nodes, access points have a clear advantage, with the possibility of having multiple access points connected by a wired LAN.

One IEEE 802.11 AP can typically communicate with 30 client systems located within a radius of 103 m. However, the actual range of communication can vary significantly, depending on such variables as indoor or outdoor placement, height above ground, nearby obstructions, other electronic devices that might actively interfere with the signal by broadcasting on the same frequency, type of antenna, the current weather, operating radio frequency, and the power output of devices. Network designers can extend the range of APs through the use of repeaters and reflectors, which can bounce or amplify radio signals that ordinarily would go un-received. In experimental conditions, wireless networking has operated over distances of several hundred kilometers.

Most jurisdictions have only a limited number of frequencies legally available for use by wireless networks. Usually, adjacent WAPs will use different frequencies (channels) to communicate with their clients in order to avoid interference between the two nearby systems. Wireless devices can "listen" for data traffic on other frequencies, and can rapidly switch from one frequency to another to achieve better reception. However, the limited number of frequencies becomes problematic in crowded downtown areas with tall buildings using multiple WAPs. In such an environment, signal overlap becomes an issue causing interference, which results in signal droppage and data errors.

One impediment to increasing the speed of wireless communications comes from Wi-Fi's use of a shared communications medium. Thus, two stations in infrastructure mode that are communicating with each other even over the same AP must have each and every frame transmitted twice: from the sender to the AP, then from the AP to the receiver. This approximately halves the effective bandwidth, so an AP is only able to use somewhat less than half the actual over-the-air rate for data throughput. Thus a typical 54 Mbit/s wireless connection actually carries TCP/IP data at 20 to 25 Mbit/s. Users of legacy wired networks expect faster speeds, and people using wireless connections keenly want to see the wireless networks catch up.

Networking power management refers to the set of features that a user can configure to allow the devices in a network to save energy. For example, the most common networking power management feature is Wake on LAN (sometimes referred to as WoL). Wake on LAN allows the device to be woken up from sleep by desired network traffic.

The Wake on LAN patterns may enable the device to wake when accessed by the network while minimizing spurious wakes. In addition to more targeted wake patterns, support may be added for Address Resolution Protocol (ARP) and Neighbor Solicitation (NS) offloads. ARP and NS protocols map Internet Protocol (IP) addresses to a MAC address. ARP and NS protocols are commonly used to verify whether a device is still present on the network, often without actually needing to access the device. By offloading ARP and NS responses to a network adapter, the device is no longer woken up merely to maintain network presence. Although, strides have been made in reducing communication overhead, and, thereby, battery consumption, there remain heretofore unaddressed needs with previous solutions.

SUMMARY

Example embodiments of the present disclosure provide systems of power efficient Wi-Fi. Briefly described, in architecture, one example embodiment of the system, among others, can be implemented as follows: a first wireless device in communication with an access point at a first rate by a first communication protocol and with a second wireless device by a second communication protocol at a second rate, the first wireless device configured to buffer a communication from the access point intended for the second wireless device.

Embodiments of the present disclosure can also be viewed as providing methods for power efficient Wi-Fi. In this regard, one embodiment of such a method, among others, can be broadly summarized by the following steps: monitoring by a first device of a communication from an access point intended for a second wireless device; and when a communication intended for the second wireless device is detected by the first device, buffering the communication from the access point as a proxy for the second wireless device.

DETAILED DESCRIPTION

Figure 1:
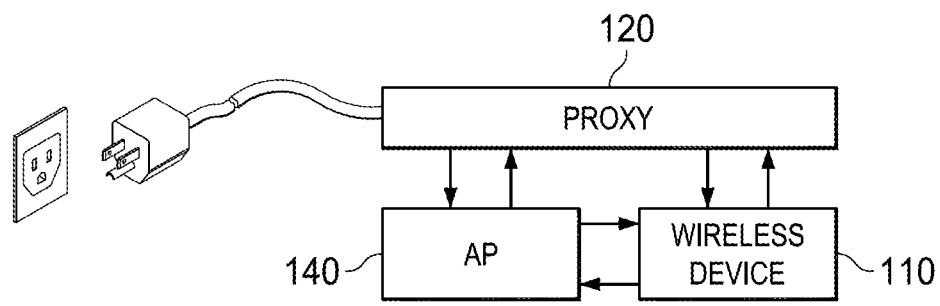
FIG. 1 is a system diagram of an example embodiment of a system of power efficient Wi-Fi.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Wake patterns refer to network packet filters that determine if incoming network traffic should wake the device. These patterns may be enabled on a network adapter. Wake patterns and other methods previously supported by a network adapter may include, among others: wake on new incoming TCP connection for IPv4 and IPv6, 802.1x re-authentication packets, bitmapped patterns, a magic packet, ARP offload, NS offload, low power on media disconnect, and wake on Wireless LAN.

Most network adapters can be programmed with bitmapped pattern filters. Bitmapped patterns are defined by a bitmap mask and a pattern filter. As network packets are received, they are masked using the bitmap mask and then compared to the pattern filter. If there is a match, the network adapter wakes the device. The magic packet does not need or use a pattern. Magic packet is used by some applications including most media sharing applications.

ARP offload refers to the ability of the network adapter to respond to an IPv4 ARP request without waking the device. Both the hardware and the driver must support ARP offload to enable this feature. NS offload is the ability of the network adapter to respond to a Neighbor Discovery Neighbor Solicitation request with a Neighbor Advertisement without waking the device. Both the hardware and the driver must support NS offload to enable this feature.

Lower Power on Media Disconnect is the ability of the network adapter to go to sleep when it is not in use. When media has been disconnected (for example, a cable is unplugged), the device enters the low power state and disables the LAN. The device will automatically detect when the cable is plugged in again and return the network adapter to full power. Low Power on Media Disconnect may be disabled when the device goes to sleep.

In addition to the features defined for a wired LAN, devices that support Wake on Wireless LAN must be able to maintain a connection to the access point while the device is in sleep mode. In addition to receiving packets from the wireless access point and filtering them, the wireless network adapter must be able to handle security key updates. GroupWise Transient Key updates are handled by the wireless network adapter while the computer is in sleep state. For Pairwise Transient Key updates or user authentication, the network adapter must wake the device to handle the request.

As with wired WoL, while the device is in the sleep state, the network adapter will apply the packet filters and respond using power management offloads (if applicable). If the connection is lost, the network adapter may re-establish the connection to the same access point. To roam or connect to another access point, the network adapter must wake the device.

In example embodiments of the systems and methods of power efficient Wi-Fi disclosed herein, the pinging of the access point by the wireless device is off-loaded to a wall powered device, such as a charger. FIG. 1 provides a system diagram of an example embodiment of a system of power efficient Wi-Fi including wireless device 110, secondary device 120, and access point 140. Wall powered, secondary device 120 acts as a proxy for wireless device 110. If, for example, mobile device 110 is listening for a communication, such as a VOIP call, typically, mobile device 110 is connected to Wi-Fi access point 140 looking for information being sent to mobile device 110. Without secondary device 120, mobile device 110 is listening to beacons all the time; every 500 ms or so, for example, the device wakes up to determine if a communication is intended for the device. Example embodiments of the disclosed systems and methods of power efficient WiFi introduce secondary device 120, for example, in the form of a wall charger, to act as a proxy to primary wireless device 110.

In example embodiments disclosed herein, primary wireless device 110 infrequently sends a ping to secondary device 120 to determine if there are any communications from access point 140 for primary wireless device 110. Secondary device 120, ideally connected to wall power, is wirelessly connected to access point 140, acting as a connected proxy so that primary wireless device 110, typically battery powered, does not always have to be connected. In a situation in which an incoming communication is intended for primary device 110, secondary device 120 receives the notification and buffers whatever is sent from access point 140 intended for primary wireless device 110 and acknowledges the receipt. Then, when primary wireless device 110 pings secondary device 120, secondary device 120 sends the buffered communication, for example, a VOIP call to primary wireless device 110. If information is requested from primary wireless device 110, secondary wireless device 120 sends the latest information that was provided by primary wireless device 110 (and cached in secondary device 120). As far as access point 140 is concerned, access point 140 thinks it is communicating directly with primary wireless device 110.

In an example embodiment of the systems and methods of power efficient Wi-Fi disclosed herein, secondary device 120 comprises a Wi-Fi station connected to access point 140. Secondary device 120 also listens for pings from primary wireless device 110 so that it can send primary wireless device 110 any communication from access point 140 intended for primary wireless device 110 while primary wireless device 110 was "asleep". In an example embodiment, secondary device 120 receives the communication intended for primary wireless device 110. Instead of primary wireless device 110 always listening and connected to access point 140, secondary device 120 does the listening and connecting, considerably decreasing battery consumption for primary wireless device 110, with primary wireless device 110 still being able to receive communications. Communications may include calls and other functions as well.

An application is loaded on primary wireless device 110 that listens periodically for small packets from secondary device 120. When secondary device 120 sends a packet to primary wireless device 110 communicating available data, primary wireless device 110 connects to secondary device 120 and secondary device 120 sends the data to primary wireless device 110. These pings/action frames may be sent from primary wireless device 110 through the high level API's to communicate with secondary device 120. Primary wireless device 110 periodically sends the action frames. If secondary device 120 has no data for primary wireless device 110, the WiFi radio of primary wireless device 110 reeenters sleep mode. Secondary device 120 is the device with a constant communication link with access point 140, consuming a majority of the power. If an incoming connection request occurs, such as an incoming VOIP call, secondary device 120 takes the call and starts waiting for primary wireless device 110 to ping it. When primary wireless device 110 pings secondary device 120, secondary device 120 tells primary wireless device 110 that a communication is waiting, and that primary wireless device 110 should connect to access point 140. The WiFi radio of primary wireless device 110 will be in sleep mode unless it is sending the pings to secondary device 120.

In an example embodiment, secondary device 120 includes a WiFi radio connected to the access point 140 and also listening to the ping packets from primary wireless device 110. On a software level, secondary device 120 listens for the pings, either action frames or probe requests, and may respond to them very quickly. Secondary device 120 may have firmware to control the operation of the WiFi radio and the communication with access point 140 and with primary wireless device 110.

There are multiple potential modes of operation. A first mode of operation is pinging by primary wireless device 110 to see if a communication intended for primary wireless device 110 is pending through secondary device 120. A second mode monitors a change in state that is of interest. If there is a change in state of a device—such as a mobile device or a sensor device—then that change in state can be updated during pings from primary wireless device 110 to secondary device 120, so that if someone has requested the latest state, then secondary device 120 already has that latest state. The state changes may be buffered in secondary device 120. A sensor device may report a change in state and secondary device 120 may control a device that receives commands to change state or to communicate.

Example embodiments of the disclosed systems and methods of power efficient Wi-Fi may be used for automation applications, as an example. If a user wants to charge a device or turn a device on, those devices may be wirelessly connected into secondary device 120 that is wall-powered and secondary device 120 may be periodically pinged from those devices. Again, secondary device 120 is connected to access point 140. Secondary device 120 may perform the proxy function through a probe response packet sequence or through action frames, as non-limiting examples. Secondary device 120 is always listening for the packet or packet sequence indicating a communication for a primary device. As soon as secondary device 120 receives the packet or packet sequence, secondary device 120 may immediately respond.

In an example embodiment, secondary device 120 responds to a ping by primary wireless device 110 by responding with "connect to the access point" or "do not connect to the access point." Alternatively, if no connection is appropriate, secondary device 120 may send no response. In yet another alternative embodiment, secondary device 120 may receive the communication intended for primary wireless device 110 and forward the communication to primary wireless device 110 when primary wireless device 110 pings secondary device 120.

In an example embodiment, secondary device 120 is configured through a USB connection and a user interface (through an application on the device, for example) on primary wireless device 110. In an example implementation, secondary device 120 may appear as USB storage or a network device when a user connects it into a USB input on primary wireless device 110, for example. Secondary device 120 may pop up on the user interface and the user can interact with/configure the device on the primary wireless device user interface. Alternatively, secondary device 120 may automatically connect to whatever access point primary wireless device 110 is connected. In an alternative embodiment, an interface on secondary device 120 may be used to enter information/configure the device. An example embodiment of secondary device 120 includes a Wi-Fi chip with a microprocessor built into it and a USB interface.

In an example embodiment, secondary device 120 communicates with access point 140 and primary wireless device 110 using the same protocol, such as the IEEE802.11 protocol as a non-limiting example. In an alternative embodiment, secondary device 120 communicates with access point 140 using a first protocol, such as the IEEE802.11 protocol and with the primary wireless device 110 using a second protocol, such as Bluetooth as a non-limiting example. In either case, secondary device 120 communicates with primary wireless device 110 at a lower rate than it communicates with access point 140.

Figure 2:
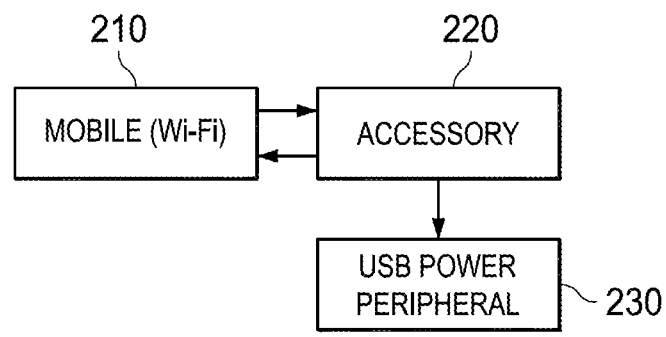
FIG. 2 is a system diagram of an example embodiment of the system of power efficient Wi-Fi of FIG. 1 in a mobile controlled USB accessory.

FIG. 2 provides a system block diagram of an example embodiment of a system of power efficient Wi-Fi in a mobile controlled USB accessory. Mobile device 210 may be used to control USB powered peripheral 230 through periodic communications with secondary device 220. In an example implementation, USB powered peripheral 230 comprises a light, a speaker or an actuator, among other example devices and secondary device 220 comprises a USB charger as an example device. Power to USB powered peripheral 230 from secondary device 220 may be controlled by mobile device 210. Power to USB powered peripheral 230 may be turned on/off, or it may be controlled with an analog level such as may be set with a pulse width modulated signal.

Figure 3:
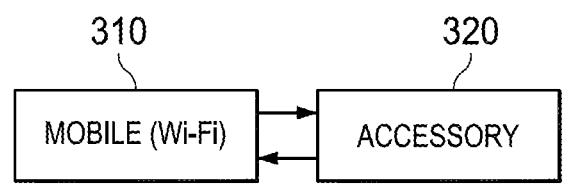
FIG. 3 is a system diagram of an example embodiment of the system of power efficient Wi-Fi of FIG. 1 used as a mobile device finder.

FIG. 3 provides a system block diagram of an example embodiment of a system of power efficient Wi-Fi used as a mobile device finder with accessory 320 (such as a USB charger) and mobile device 310. Accessory 320 may send an SSID to mobile device 310 to enable an audible beep when it is first plugged in. The user may plug in accessory 320 in various rooms to locate mobile device 310. In another implementation, accessory 320 may make a different audible sound when it detects the battery of mobile device 310 drops below a predetermined threshold.

Figure 4:
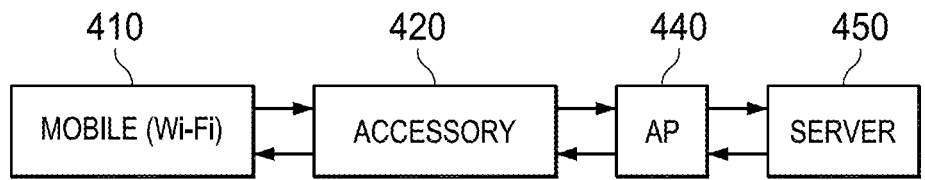
FIG. 4 is a system diagram of an example embodiment of the system of power efficient Wi-Fi of FIG. 1 used as a downloading device.

FIG. 4 provides a system block diagram of an example embodiment of a system of power efficient Wi-Fi used as a downloading device with accessory 420 (such as a USB charger), mobile device 410, access point 440 and server 450. Mobile device 410 may initiate a request to download through access point 440 from remote server 450. Mobile device 410 alerts accessory 420 of the requested download. If accessory 420 is capable of conducting the download at higher speeds or more efficiently, accessory 420 takes over the download and transfers the file to mobile device 410 (for instance multiplexed or on concurrent separate channels). Accessory 420 may have less physical constraints on its antenna configuration and on its power consumption. Accessory 420 may have more/larger antennas with larger power amplifiers. Accessory 420 may also incorporate newer technologies (such as IEEE802.11ac or WiGig) which would be much faster for downloads than IEEE802.11n, for example. Even in scenarios in which the same standards are supported—it might be faster to use a strong IEEE802.11n connection, and then relay that data via another strong IEEE802.11n connection than it would be to attempt the download directly via a weak IEEE802.11n connection. In scenarios in which mobile device 410 is connected to accessory 420 through a USB connection, the USB connection will almost always be faster—so requests to download over Wi-Fi might automatically get proxied to use the USB connection and a faster Wi-Fi radio (such as IEEE802.11ac or Wi-Gig) inside mobile device 410.

In an example embodiment, accessory 420 is configured as a Wi-Fi repeater or as a file synchronizing device. The connection to the accessory 420 may be as a wireless universal serial bus storage device acting as a synchronizing device in which the file is cached locally as needed by the operating system.

Figure 5:
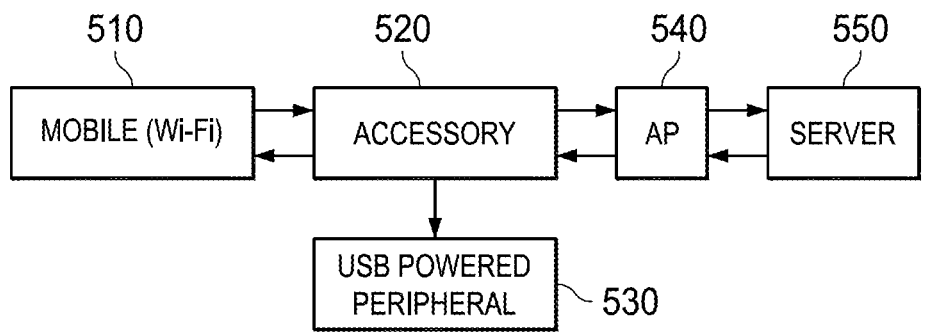
FIG. 5 is a system diagram of an example embodiment of the system of power efficient Wi-Fi of FIG. 1 used as a server polling connection trigger.

FIG. 5 provides a system block diagram of an example embodiment of a system of power efficient Wi-Fi used as a server polling connection trigger with accessory 520 (such as a USB charger), mobile device 510, USB powered peripheral 530 (such as a light, speaker, or actuator), access point 540, and remote server 550. Accessory 520 is connected to access point 540 and periodically polls or performs a long poll with remote server 550. Remote server 550 notifies accessory 520 that there is a connect request (for example, a VOIP call, chat call, location based e-coupon, among others). Mobile device 510 periodically sends a probe request and listens for a period (for example 5 ms) for a probe response before going to sleep. A user can configure mobile connection and/or security with access point 540 to be automatically enabled for accessory 520. Accessory 520 may be pre-paired with mobile device 510 or via Wi-Fi protected setup (for example through USB or push button control).

Figure 6:
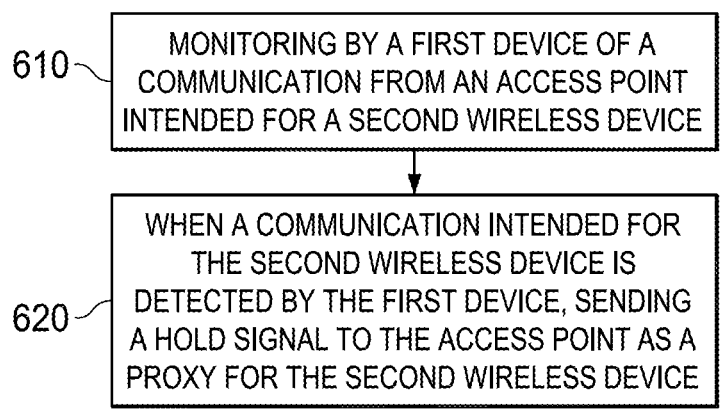
FIG. 6 is a flow diagram of an example embodiment of a method of power efficient Wi-Fi.

FIG. 6 provides a flowchart of an example embodiment of a method of power efficient Wi-Fi. In block 610, a first device monitors for a communication from an access point intended for a second wireless device. In block 620, when a communication intended for the second wireless device is detected by the first device, the first device buffers the communication as a proxy for the second wireless device. The first device is configured to send the communication to the second wireless device when the second device is ready to receive the communication initially transmitted from the access point.

The flow chart of FIG. 6 shows the architecture, functionality, and operation of a possible implementation of the power efficient Wi-Fi software. In this regard, each block represents a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present invention has been described in detail, it should be understood that various changes, substitutions and alterations can be made thereto without departing from the spirit and scope of the invention as defined by the appended claims.

Therefore, at least the following is claimed:

1. A system comprising:
a first wireless device in communication with an access point at a first rate by a first communication protocol and with a second wireless device by a second communication protocol at a second rate wherein the second wireless device infrequently sends a ping to the first wireless device to determine if there are any communications from the access point for the second wireless device, the first wireless device configured to buffer a communication from the access point intended for the second wireless device; and
send the communication to the second wireless device upon receiving the ping from the second wireless device.

2. The system of claim 1, wherein the first and second protocols are the same.

3. The system of claim 1, wherein the first and second protocols are different.

4. The system of claim 1, wherein the first wireless device is configured to communicate with the access point as a proxy for the second wireless device.

5. The system of claim 1, wherein the second wireless device is configured to ping the first wireless device at a lower rate than the first wireless device pings the access point.

6. The system of claim 1, wherein the first wireless device comprises a wall charger and the second wireless device comprises a mobile telephone.

7. The system of claim 1, wherein the first rate is higher than the second rate.

8. A method comprising:
monitoring by a first device of a communication from an access point intended for a second device wherein the second device infrequently sends a ping to the first device to determine if there are any communications from the access point for the second device; and
when a communication intended for the second device is detected by the first device, buffering the communication from the access point as a proxy for the second device and sending the communication from the first device to the second device upon receiving the ping from the second device.

9. The method of claim 8, wherein the second device communicates with the access point after the second device pings the first device.

10. The method of claim 8, wherein the first device comprises a wall charger and the second device comprises a mobile telephone.

11. The method of claim 8, wherein the first device communicates with the access point at a higher rate than the first device communicates with the second device.

12. The method of claim 8, wherein the first device communicates with the access point in a first protocol and with the second device in a second protocol.

13. A device comprising:
an accessory comprising a proxy in wireless communication with an access point and with a mobile telephone wherein the mobile telephone infrequently sends a ping to the accessory to determine if there are any communications from the access point for the mobile telephone, the accessory configured to buffer a communication from the access point intended for the mobile telephone and send the communication to the mobile telephone upon receiving the ping from the mobile phone.

14. The device of claim 13, wherein the accessory communicates with the access point with a first protocol and with the mobile telephone with a second protocol.

15. The system of claim 13, wherein the accessory is configured to communicate with the access point as a proxy for the mobile telephone.

16. The system of claim 13, wherein the accessory is configured to receive a communication from the access point as a proxy for the mobile telephone when the access point has a communication for the mobile telephone.

17. The system of claim 13, wherein the accessory is configured to send the communication received from the access point when the mobile telephone is ready to receive the communication.

18. The system of claim 13, wherein the accessory communicates with the access point at a higher rate than the module communicates with the mobile telephone.

* * * * *